Patented Aug. 23, 1932                                       1,873,935

UNITED STATES PATENT OFFICE

WILHELM LOMMEL, OF WIESDORF-ON-THE-RHINE, THEODOR GOOST, OF LEVERKUSEN-ON-THE-RHINE, AND HERMANN FRIEDRICH, OF WIESDORF-ON-THE-RHINE, GERMANY, ASSIGNORS TO I. G. FARBENINDUSTRIE AKTIENGESELLSCHAFT, OF FRANKFORT-ON-THE-MAIN, GERMANY

ACCELERATOR FOR VULCANIZATION PROCESSES

No Drawing. Application filed September 5, 1930, Serial No. 480,019, and in Germany November 8, 1927.

The present invention relates to a process of vulcanizing rubber compounds and consists in effecting the vulcanization in the presence of an accelerator of the probable formula

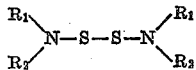

wherein $R_1$ means a cyclohexyl group and $R_2$ stands for a hydrocarbon radical, which may be linked up with $R_1$ to form a ring configuration. The invention, furthermore, relates to the vulcanized rubber compounds obtainable by the process above identified.

In accordance with the invention a compound of the above formula is incorporated, for example, by rolling or kneading within the rubber compounds to be vulcanized together with or apart from the other ingredients usually employed in vulcanization processes, such as sulfur, selenium, aromatic nitro compounds plus metal oxides or other vulcanizing agents, fillers, plasticizing agents, pigments, etc. Vulcanization of the mixtures thus produced is performed by heating with or without the application of superatmospheric pressure, advantageously to temperatures between about 100–150° C.

It may be mentioned that the term "rubber compound" is intended to include natural rubber varieties and artificial rubber like masses obtainable by polymerizing a rubber forming hydrocarbon, such as butadiene-(1.3) or homologues or analogues thereof alone or in admixture with other suitable compounds capable of being polymerized, such as styrol, vinylnaphthalenes, etc. Obviously, instead of a single one of our new vulcanization accelerators, mixtures of two or more of the same may be employed and, if desired, acclerators of another type may be used simultaneously.

This application is a continuation in part of our copending application Serial No. 240,331, filed December 15, 1927.

The following examples will illustrate the invention without restricting it thereto, the parts being by weight.

Example 1

100 parts of a rubber like mass obtained by polymerizing butadiene-(1.3) in the presence of sodium metal
60 parts of lamp black
15 parts of zinc white
4 parts of a mixture of equal parts of colophony and pine tar
2 parts of stearic acid
1 part of sulfur, and
1.8 parts of di-(thio-methyl-cyclohexylamine)

are mixed by rolling or kneading and the mixture is vulcanized at a steam pressure of 4 atmospheres (about 150° C.) for 60 minutes. The vulcanizate thus obtainable shows a tensile strength of 197 kg/sqcm at a stretch of 605%.

Example 2

100 parts of a rubber like mass obtained by polymerizing butadiene-(1.3) in the presence of sodium metal
60 parts of lamp black
15 parts of zinc white
4 parts of a mixture of equal parts of colophony and pine tar
2 parts of stearic acid
1 part of sulfur, and
1.8 parts of di-(thio - ethyl - cyclo - hexylamine)

are mixed by rolling or kneading and the mixture is vulcanized at a steam pressure of 4 atmospheres (about 150° C.) for 80 minutes. The vulcanizate thus obtainable shows a tensile strength of 193 kg/sqcm at a stretch of 600%.

*Example 3*

100 parts of a rubber like mass obtained by polymerizing butadiene-(1.3) in the presence of sodium metal
60 parts of lamp black
15 parts of zinc white
4 parts of a mixture of equal parts of colophony and pine tar
2 parts of stearic acid
1 part of sulfur, and
1.8 parts of di-(N-thio-dekahydro-quinaldine) of the formula:

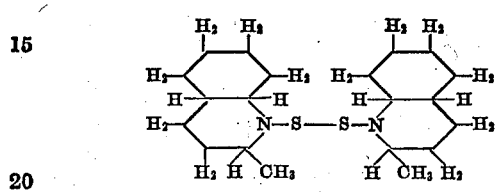

are mixed by rolling or kneading and the mixture is vulcanized at a steam pressure of 4 atmospheres (about 150° C.) for 40 minutes. The vulcanizate thus obtainable shows a tensile strength of 200 kg/sqcm at a stretch of 705%.

*Example 4*

100 parts of smoked sheets
5 parts of zinc oxide
3.5 parts of sulfur, and
1 part of di-(thio-cyclohexyl-methylamine)

are mixed by rolling or kneading and the mixture is vulcanized at a steam pressure of 3½ atmospheres (about 145° C.) for 30 minutes. The vulcanizate thus obtainable shows a tensile strength of 223 kg/sqcm at a stretch of 883%.

The compounds employed as accelerators in the above examples may be prepared by treating hexahydromethylaniline, hexahydroethylaniline or dekahydroquinaldine with sulfur chloride ($S_2Cl_2$) in etherial solution. Other compounds which are operable as accelerators in our process and which can be prepared in a similar manner are, for example,

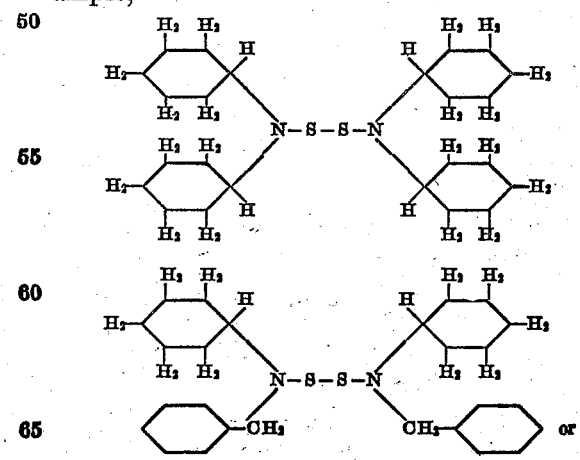

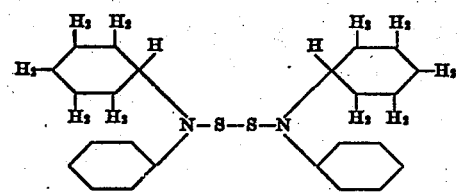

We claim:—

1. Process for the manufacture of vulcanized rubber compounds which consists in effecting the vulcanization in the presence of a compound of the probable formula:

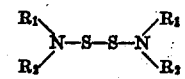

wherein $R_1$ means a cyclohexyl group and $R_2$ stands for a hydrocarbon radical, which may be linked up with $R_1$ to form a ring configuration.

2. Process for the manufacture of vulcanized rubber compounds which consists in effecting the vulcanization in the presence of a compound of the probable formula:

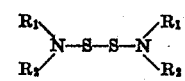

wherein $R_1$ means a cyclohexyl group and $R_2$ stands for an alkyl group, which may be linked up with $R_1$ to form a ring configuration.

3. Process for the manufacture of vulcanized rubber compounds which consists in effecting the vulcanization in the presence of a compound of the probable formula:

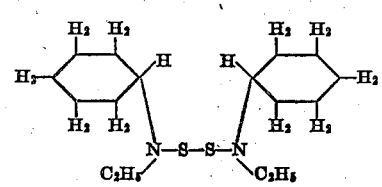

4. Process for the manufacture of vulcanized rubber compounds which consists in effecting the vulcanization in the presence of a compound of the probable formula:

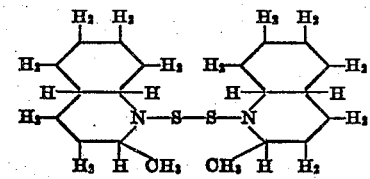

5. As new products of manufacture, vulcanized rubber compounds obtainable according to claim 1.

6. As new products of manufacture, vulcanized rubber compounds obtainable according to claim 2.

7. As new products of manufacture, vulcanized rubber compounds obtainable according to claim 3.

8. As new products of manufacture, vulcanized rubber compounds obtainable according to claim 4.

In testimony whereof, we affix our signatures.

WILHELM LOMMEL.
THEODOR GOOST.
HERMANN FRIEDRICH.